United States Patent
Ding et al.

(10) Patent No.: US 11,034,348 B2
(45) Date of Patent: Jun. 15, 2021

(54) AGENT PRIORITIZATION FOR AUTONOMOUS VEHICLES

(71) Applicant: Waymo LLC, Mountain View, CA (US)

(72) Inventors: Kai Ding, Santa Clara, CA (US); Khaled Refaat, Mountain View, CA (US); Stephane Ross, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 156 days.

(21) Appl. No.: 16/264,136

(22) Filed: Jan. 31, 2019

(65) Prior Publication Data

US 2020/0156632 A1     May 21, 2020

Related U.S. Application Data

(63) Continuation-in-part of application No. 16/198,130, filed on Nov. 21, 2018, which is a
(Continued)

(51) Int. Cl.
*B60W 30/095* (2012.01)
*G05D 1/02* (2020.01)
*G05D 1/00* (2006.01)

(52) U.S. Cl.
CPC ....... *B60W 30/0956* (2013.01); *G05D 1/0088* (2013.01); *G05D 1/0214* (2013.01); *G05D 2201/0213* (2013.01)

(58) Field of Classification Search
CPC ............ G06Q 50/30; G06Q 10/08355; G06Q 10/06312; G06Q 10/063118;
(Continued)

(56) References Cited

U.S. PATENT DOCUMENTS 8,706,298 B2   4/2014  Goulding
9,092,985 B2   7/2015  Richardson
(Continued)

OTHER PUBLICATIONS

Baumann et al., "Predicting Ego-Vehicle Paths from Environmental Observations with a Deep Neural Network," 2018 IEEE International Conference on Robotics and Automation (ICRA), May 2018, 4709-4716.
(Continued)

*Primary Examiner* — Anne Marie Antonucci
*Assistant Examiner* — Andrew J Cromer
(74) *Attorney, Agent, or Firm* — Fish & Richardson P.C.

(57) ABSTRACT

Methods, systems, and apparatus, including computer programs encoded on a computer storage medium, for identifying high-priority agents in the vicinity of a vehicle. In one aspect, a method comprises processing an input that characterizes a trajectory of the vehicle in an environment using an importance scoring model to generate an output that defines a respective importance score for each of a plurality of agents in the environment in the vicinity of the vehicle. The importance score for an agent characterizes an estimated impact of the agent on planning decisions generated by a planning system of the vehicle which plans a future trajectory of the vehicle. The high-priority agents are identified as a proper subset of the plurality of agents with the highest importance scores.

20 Claims, 6 Drawing Sheets

Related U.S. Application Data continuation-in-part of application No. 16/196,769, filed on Nov. 20, 2018, now Pat. No. 10,739,777.

(58) Field of Classification Search
CPC ... G06Q 10/063116; G06Q 10/063114; B60W 30/0956; B60W 30/08; G06K 9/00805; B60K 2370/175; G06N 5/022; G05D 1/0221; G05D 1/0214; G05D 1/0088
See application file for complete search history.

(56) References Cited

U.S. PATENT DOCUMENTS

| | | | |
|---|---|---|---|
| 9,248,834 B1 | 2/2016 | Ferguson et al. | |
| 10,059,334 B1 | 8/2018 | Zhu et al. | |
| 10,739,777 B2 | 8/2020 | Refaat et al. | |
| 2006/0165811 A1 | 7/2006 | Black | |
| 2008/0161986 A1 | 7/2008 | Breed | |
| 2010/0104199 A1* | 4/2010 | Zhang | G08G 1/165 382/199 |
| 2012/0070034 A1 | 3/2012 | Xiao et al. | |
| 2013/0054106 A1* | 2/2013 | Schmudderich | G06K 9/6293 701/96 |
| 2014/0140353 A1 | 5/2014 | Stahlin et al. | |
| 2014/0156806 A1 | 6/2014 | Karpistsenko | |
| 2015/0286219 A1 | 10/2015 | Reichel et al. | |
| 2016/0082953 A1* | 3/2016 | Teller | B60W 30/08 701/23 |
| 2018/0046920 A1 | 2/2018 | Yang | |
| 2018/0194349 A1 | 7/2018 | McGill, Jr. | |
| 2018/0299275 A1 | 10/2018 | Fong et al. | |
| 2020/0159215 A1 | 5/2020 | Ding et al. | |
| 2020/0159232 A1 | 5/2020 | Refaat et al. | |
| 2020/0333794 A1 | 10/2020 | Refaat et al. | |

OTHER PUBLICATIONS

Deo et al., "Multi-Modal Trajectory Prediction of Surrounding Vehicles with Maneuver based LSTMs," https://arxiv.org/abs/1805.05499, May 2018, 6 pages.

Kim et al., "Probabilistic Vehicle Trajectory Prediction over Occupancy Grid Map via Recurrent Neural Network," https://arxiv.org/abs/1704.07049v1, Apr. 2017, 6 pages.

PCT International Search Report and Written Opinion in International Appln. No. PCT/US2019/060187, dated Mar. 19, 2020, 16 pages.

Refaat et al., "Agent Prioritization for Autonomous Navigation," https://arxiv.org/abs/1909.08792, Sep. 2019, 8 pages.

Schwarting et al., "Planning and Decision-Making for Autonomous Vehicles," Annual Review of Control, Robotics, and Autonomous Systems, Jan. 2018,1:187-210.

PCT International Search Report and Written Opinion in International Appln. No. PCT/US2019/060886, dated Mar. 13, 2020, 11 pages.

Nutzel, "AI-based movement planning for autonomous and teleoperated vehicles including the development of a simulation environment and an intelligent agent," retrieved from URL <https://mediatum.ub.tum.de/doc/1453739/file.pdf>, Jul. 2018, retrieved on Mar. 3, 2020, 120 pages.

PCT International Search Report and Written Opinion in International Appln. No. PCT/US2019/058836, dated Feb. 27, 2020, 12 pages.

Mehrasa et al. "Learning Person Trajectory Representations for Team Activity Analysis," arXiv 1706.00893v1, Jun. 3, 2017, 9 pages.

\* cited by examiner

AGENT PRIORITIZATION FOR AUTONOMOUS VEHICLES

CROSS-REFERENCE TO RELATED APPLICATIONS

This application is a continuation-in-part of, and claims priority to, U.S. patent application Ser. No. 16/198,130, titled "AGENT PRIORITIZATION FOR AUTONOMOUS VEHICLES," filed on Nov. 21, 2018, and is a continuation-in-part of, and claims priority to, U.S. patent application Ser. No. 16/196,769, titled "TRAJECTORY REPRESENTATION IN BEHAVIOR PREDICTION SYSTEMS," filed on Nov. 20, 2018. The disclosure of the foregoing application is incorporated herein by reference in its entirety for all purposes.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on-board a vehicle that generates prediction data for agents in a vicinity of the vehicle based on the estimated impacts of the agents on planning decisions generated by a planning system of the vehicle.

According to a first aspect, there is provided a method performed by one or more data processing apparatus, the method including: processing an input that characterizes a trajectory of a vehicle in an environment using an importance scoring model to generate an output that defines a respective importance score for each of multiple agents in the environment in the vicinity of the vehicle, where the importance score for an agent characterizes an estimated impact of the agent on planning decisions generated by a planning system of the vehicle which plans a future trajectory of the vehicle; identifying, as high-priority agents, a proper subset of the multiple agents with the highest importance scores; for only those agents of the multiple agents that are identified as high-priority agents, generating data characterizing the agents using a first prediction model; and providing the data characterizing the high-priority agents generated using the first prediction model to the planning system of the vehicle to generate the planning decisions which plan the future trajectory of the vehicle.

In some implementations, the method further includes obtaining historical data characterizing the trajectory of the vehicle in the environment, the historical data including, for each of multiple previous time points, data defining: (i) a spatial position in the environment occupied by the vehicle at the previous time point, and (ii) respective values of each motion parameter in a predetermined set of motion parameters, where the value of each motion parameter characterizes a respective feature of a motion of the vehicle at the previous time point; generating a representation of the trajectory of the vehicle in the environment, where: the representation of the trajectory of the vehicle in the environment is a concatenation of multiple channels; each channel is represented as a two-dimensional array of data values; each position in each channel corresponds to a respective spatial position in the environment; corresponding positions in different channels correspond to the same spatial position in the environment; the channels include a time channel and a respective motion channel corresponding to each motion parameter in the predetermined set of motion parameters; and for each particular spatial position in the environment occupied by the vehicle at a particular previous time point: the position in the time channel which corresponds to the particular spatial position defines the particular previous time point; and for each motion channel, the position in the motion channel which corresponds to the particular spatial position defines the value of the motion parameter corresponding to the motion channel at the particular previous time point; where processing an input that characterizes a trajectory of the vehicle in the environment includes processing an input that includes the representation of the trajectory of the vehicle in the environment.

In some implementations, the output of the importance scoring model includes an output channel that is represented as a two-dimensional array of data values; each position in the output channel corresponds to a respective spatial position in the environment; and for each spatial position in the environment that is occupied by an agent of the multiple agents at a current time point, the position in the output channel that corresponds to the spatial position defines an importance score of the agent.

In some implementations, the method further includes, for each agent of the multiple agents: generating a respective feature representation of the agent, including: generating one or more importance score features of the agent from the output channel; generating one or more additional features of the agent based on sensor data captured by one or more sensors of the vehicle; and generating the feature representation of the agent from the importance score features of the agent and the additional features of the agent; processing the feature representation of the agent using an importance score refining model to generate a refined importance score for the agent that characterizes an estimated impact of the agent on planning decisions generated by a planning system of the vehicle which plans a future trajectory of the vehicle.

In some implementations, obtaining the respective values of each motion parameter in the predetermined set of motion parameters for a previous time point includes one or more of: obtaining the value of a velocity motion parameter which characterizes a velocity of the vehicle at the previous time point; obtaining the value of an acceleration motion parameter which characterizes an acceleration of the vehicle at the previous time point; and obtaining the value of a heading motion parameter which characterizes a heading of the vehicle at the previous time point.

In some implementations, the input processed by the importance scoring model further includes one or more of: (i) a road-graph channel representing a known geometry of the environment, (ii) a vehicle localization channel which represents a spatial position of the vehicle in the environment at a current time point by a vehicle bounding box, and (iii) an auxiliary localization channel which represents respective spatial positions of the multiple agents in the environment at a current time point by respective bounding boxes.

In some implementations, the method further includes generating a joint representation of trajectories of the multiple agents in the environment in the vicinity of the vehicle, where the input processed by the importance scoring model further includes the joint representation of the trajectories of the multiple agents.

In some implementations, the joint representation of the trajectories of the multiple agents in the environment includes an auxiliary time channel and a respective auxiliary motion channel corresponding to each motion parameter in the predetermined set of motion parameters; each channel is represented as a two-dimensional array of data values and each data value in each channel corresponds to a respective spatial position in the environment; and for each particular spatial position in the environment occupied by a particular agent of the multiple agents at a particular previous time point: the data value in the auxiliary time channel which corresponds to the particular spatial position defines the particular previous time point; and for each auxiliary motion channel, the data value in the auxiliary motion channel which corresponds to the particular spatial position defines a value of the motion parameter corresponding to the auxiliary motion channel which characterizes a respective feature of a motion of the particular agent at the particular previous time point.

In some implementations, identifying, as high-priority agents, a proper subset of the multiple agents with the highest importance scores includes: identifying, as high-priority agents, a predetermined number of the multiple agents with the highest importance scores.

In some implementations, the method further includes: for one or more of the multiple agents that are not identified as high-priority agents, generating data characterizing the one or more agents using a second prediction model, where the first prediction model has a first number of model parameters, the second prediction model has a second number of model parameters, and the first number of model parameters is greater than the second number of model parameters; and providing the data characterizing the one or more agents generated using the second prediction model to the planning system in addition to the data characterizing the high priority agents generated using the first prediction model.

According to a second aspect, there is provided a method, performed by one or more data processing apparatus, for training an importance scoring model, where the importance scoring model is configured to process a feature representation of an agent in a vicinity of a vehicle to generate an importance score for the agent, where the importance score for the agent characterizes an impact of the agent on planning decisions generated by a planning system of the vehicle which plans a future trajectory of the vehicle, the method including: generating multiple training examples, where each given training example includes: (i) respective feature representations of multiple given agents in a given vicinity of a given vehicle at a given time point, and (ii) data defining a given ranking of the given agents in the given vicinity of the given vehicle in order of their impact on given planning decisions generated by a given planning system which plans a future trajectory of the given vehicle, where generating a particular training example includes: for each of multiple particular agents in a particular vicinity of a particular vehicle at a particular time point, generating respective data characterizing a predicted future behavior of the particular agent using a behavior prediction system (e.g., neural network); providing, for each of the particular agents in the particular vicinity of the particular vehicle at the particular time point, the respective data characterizing the predicted future behavior of the particular agent to a particular planning system; receiving, from the particular planning system, particular planning decisions which plan a future trajectory of the particular vehicle; and determining, based on the particular planning decisions, a particular ranking of the particular agents in the particular vicinity of the particular vehicle at the particular time point in order of their impact on the particular planning decisions; and training the importance scoring model based on the training examples, including, for each given training example: training the importance scoring model to generate respective importance scores for the given agents characterized by the given training example that conform to the given ranking specified by the given training example.

In some implementations, generating training examples includes generating the training examples based on real or simulated driving data logs.

In some implementations, training the importance scoring model to generate respective importance scores for the given agents characterized by the given training example that conform to the given ranking specified by the given training example includes: processing a first feature representation of a first agent characterized by the given training example to generate a first importance score; processing a second feature representation of a second agent characterized by the given training example to generate a second importance score; determining a loss based on whether the first importance score and the second importance score conform to the given ranking specified by the given training example; and updating current parameter values of the importance scoring model based on the loss.

In some implementations, each of the particular planning decisions which plan the future trajectory of the particular vehicle include: (i) an action to be performed by the particular vehicle, and (ii) a particular agent in the particular vicinity of the particular vehicle which prompts the particular planning system to generate the particular planning decision.

In some implementations, determining, based on the particular planning decisions, a particular ranking of the particular agents in the particular vicinity of the particular vehicle at the particular time point in order of their impact on the particular planning decisions includes: determining a respective planning score for each particular agent based on any actions which the particular agent prompts the particular planning system to generate; and determining the particular ranking of the particular agents based on the respective planning scores of the particular agents.

In some implementations, each training example includes respective feature representations of every agent in the vicinity of the vehicle that is detected by an object detection system of the vehicle.

In some implementations, the given ranking of the given agents defines: (i) a partition of the given agents into multiple groups, where each group includes one or more given agents, and (ii) for each pair of groups including a first group and a second group, whether the given agents in the first group have a greater impact on the given planning decisions than the given agents in the second group.

According to a third aspect, there are provided one or more non-transitory computer storage media storing instructions that when executed by one or more computers cause the one or more computers to perform operations including the operations of the previously described methods.

According to a fourth aspect, there is provided a system, including a data processing apparatus; and a memory in data communication with the data processing apparatus and storing instructions that cause the data processing apparatus to perform operations including the operations of the previously described methods.

Particular embodiments of the subject matter described in this specification can be implemented so as to realize one or more of the following advantages.

In order for a planning system of a vehicle to generate planning decisions which cause the vehicle to travel along a safe and comfortable trajectory, the planning system must be provided with timely and accurate prediction data (e.g., behavior prediction data) for the agents in the vicinity of the vehicle. However, generating prediction data for an agent in the vicinity of the vehicle may require substantial computational resources (e.g., memory, computing power, or both). In certain situations, a large number of other agents in the environment may be in the vicinity of the vehicle (e.g., when the vehicle is traveling along a busy highway). In these situations, the limited computational resources available on-board the vehicle may be insufficient to generate timely prediction data for all the agents in the vicinity of the vehicle.

The on-board system described in this specification can concentrate the limited computational resources available on-board the vehicle (e.g., memory, computing power, or both) on generating precise prediction data for only those agents which are likely to have the biggest impact on the planning decisions generated by the planning system. The system can generate prediction data for the remaining "low-priority" agents using a more computationally efficient prediction model. In this manner, the on-board system described in this specification can generate timely prediction data which enables the planning system to generate planning decisions that cause the vehicle to travel along a safe and comfortable trajectory despite the limited computational resources available on-board the vehicle.

The on-board system described in this specification uses a data representation system to generate trajectory representation data which defines the trajectory of a vehicle and the trajectories of one or more agents as a collection of two-dimensional (2D) "channels". The on-board system can process the trajectory representation data using a convolutional neural network to generate an output that defines respective importance scores for each of the agents. The representation of the trajectories as a collection of 2D channels is more compact than a representation as a collection of 3D channels and, unlike a 1D representation, can be processed by multi-dimensional convolutional filters in the convolutional neural network. Therefore, the on-board system may consume fewer computational resources (e.g., memory, computing power, or both) by representing the trajectories as a collection of 2D channels than would be the case if the on-board system represented the trajectories as a collection of 3D channels. Moreover, the convolutional neural network can learn to exploit complex interactions between different spatial regions of the trajectory representation data by processing the collection of 2D channels representing the trajectories using multi-dimensional convolutional filters and thereby generate more accurate importance scores.

The on-board system described in this specification can process importance scores generated using an importance scoring model (i.e., that processes trajectory representation data represented as a collection of 2D channels) and additional features based on sensor data captured by the sensors of the vehicle to generate "refined" importance scores. The refined importance scores may be more accurate than the importance scores generated by the importance scoring model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of a vehicle can generate prediction data (e.g., behavior prediction data) for agents in the vicinity of the vehicle. The agents in the vicinity of the vehicle may be, for example, pedestrians, bicyclists, or other vehicles. To generate the prediction data, the on-board system determines a respective importance score for each agent in the vicinity of the vehicle. The importance score for an agent characterizes an estimated impact of the agent on planning decisions generated by a planning system of the vehicle which plan the future trajectory of the vehicle. The on-board system identifies which of the agents in the vicinity of the vehicle are "high-priority" agents based on the importance scores, and generates precise prediction data for these high-priority agents using a prediction model. For the remaining agents in the vicinity of the vehicle which are not high-priority agents, the on-board system can use less computationally-intensive (but potentially less precise) prediction models to generate prediction data. Alternatively, the on-board system may refrain from generating prediction data for some or all of the agents that are not determined to be high-priority agents. These features and other features are described in more detail below.

Figure 1:
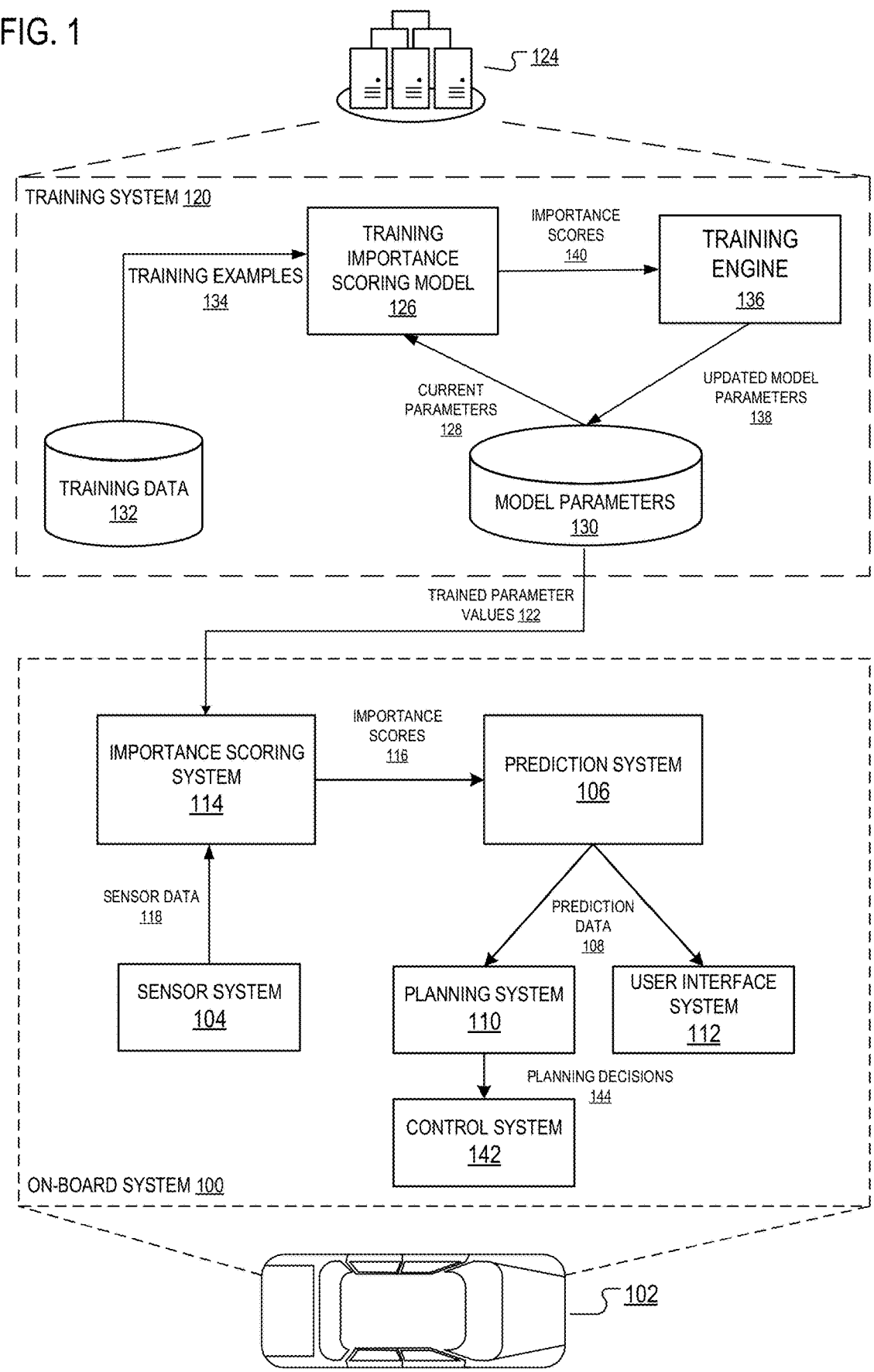
FIG. 1 is a block diagram of an example on-board system.

FIG. 1 is a block diagram of an example on-board system 100. The on-board system 100 is composed of hardware and software components, some or all of which are physically located on-board a vehicle 102. In some cases, the on-board system 100 can generate planning decisions which plan the future trajectory of the vehicle 102, present information to the driver of the vehicle 102 to assist the driver in operating the vehicle safely, or both. For example, in response to determining that the trajectory of another vehicle is likely to cross the trajectory of the vehicle 102, the on-board system 100 may generate planning decisions which adjust the future trajectory of the vehicle 102 to avoid a collision (e.g., by braking). As another example, in response to determining that the trajectory of another vehicle is likely to cross the trajectory of the vehicle 102, the on-board system 100 may present an alert message which prompts the driver of the vehicle 102 to adjust the trajectory of the vehicle 102 to avoid a collision.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a collision detection system or a navigation system).

The on-board system 100 includes a sensor system 104 which enables the on-board system 100 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The on-board system 100 can use the sensor data continually generated by the sensor system 104 to track the trajectories of agents (e.g., pedestrians, bicyclists, other vehicles, and the like) in the environment in the vicinity of the vehicle 102. The trajectory of an agent refers to data defining, for each of multiple time points, the spatial position occupied by the agent in the environment at the time point and characteristics of the motion of the agent at the time point. The characteristics of the motion of an agent at a time point can include, for example, the velocity of the agent (e.g., measured in miles per hour—mph), the acceleration of the agent (e.g., measured in feet per second squared), and the heading of the agent (e.g., measured in degrees). The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

To track the trajectory of an agent in the environment in the vicinity of the vehicle 102, the on-board system 100 can maintain (e.g., in a physical data storage device) historical data defining the trajectory of the agent up to the current time point. The on-board system 100 can use the sensor data continually generated by the sensor system 104 to continually update (e.g., every 0.1 seconds) the historical data defining the trajectory of the agent. At a given time point, the historical data may include data defining: (i) the respective trajectories of agents in the vicinity of the vehicle 102, and (ii) the trajectory of the vehicle 102 itself, up to the given time point.

At any given time point, one or more agents in the environment may be in the vicinity of the vehicle 102. The agents in the vicinity of the vehicle 102 may be, for example, pedestrians, bicyclists, or other vehicles. The on-board system 100 uses a prediction system 106 to continually (i.e., at each of multiple time points) generate prediction data 108 which characterizes some or all of the agents in the vicinity of the vehicle 102. For example, for each of multiple agents in the vicinity of the vehicle 102, the prediction data 108 may be behavior prediction data which defines respective probabilities that the agent makes each of a predetermined number of possible driving decisions (e.g., yielding, changing lanes, passing, braking, or accelerating). As another example, for each of the multiple agents in the vicinity of the vehicle 102, the prediction data 108 may be classification prediction data which defines respective probabilities that the agent is each of a predetermined number of possible agent types (e.g., animal, pedestrian, bicyclist, car, or truck).

The on-board system 100 can provide the prediction data 108 generated by the prediction system 106 to a planning system 110, a user interface system 112, or both.

When the planning system 110 receives the prediction data 108, the planning system 110 can use the prediction data 108 to generate planning decisions 144 which plan the future trajectory of the vehicle 102. The planning decisions 144 generated by the planning system 110 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. In a particular example, the on-board system 100 may provide the planning system 110 with behavior prediction data indicating that the future trajectory of another vehicle is likely to cross the future trajectory of the vehicle 102, potentially resulting in a collision. In this example, the planning system 110 can generate a planning decision 144 to apply the brakes of the vehicle 102 to avoid a collision.

The planning decisions 144 generated by the planning system 110 can be provided to a control system 142 of the vehicle 102. The control system 142 of the vehicle can control some or all of the operations of the vehicle by implementing the planning decisions 144 generated by the planning system. For example, in response to receiving a planning decision 144 to apply the brakes of the vehicle, the control system 142 of the vehicle 102 may transmit an electronic signal to a braking control unit of the vehicle. In response to receiving the electronic signal, the braking control unit can mechanically apply the brakes of the vehicle.

When the user interface system 112 receives the prediction data 108, the user interface system 112 can use the prediction data 108 to present information to the driver of the vehicle 102 to assist the driver in operating the vehicle 102 safely. The user interface system 112 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 100 may provide the user interface system 112 with prediction data 108 indicating that the future trajectory of another vehicle is likely to cross the future trajectory of the vehicle 102, potentially resulting in a collision. In this example, the user interface system 112 can present an alert message to the driver of the vehicle 102 with instructions to adjust the trajectory of the vehicle 102 to avoid a collision.

In order for the planning system 110 to generate planning decisions which cause the vehicle 102 to travel along a safe and comfortable trajectory, the on-board system 100 must provide the planning system 110 with timely and accurate prediction data 108. However, the prediction system 106 may require substantial computational resources (e.g., memory, computing power, or both) to generate prediction data 108 for an agent in the vicinity of the vehicle. In certain situations, a large number of other agents in the environment may be in the vicinity of the vehicle 102 (e.g., when the vehicle 102 is traveling along a busy highway). In these situations, the limited computational resources available on-board the vehicle 102 may be insufficient for the prediction system 106 to generate timely prediction data 108 for all the agents in the vicinity of the vehicle 102.

To enable the prediction system 106 to generate timely prediction data 108, the on-board system 100 can identify one or more of the agents in the vicinity of the vehicle 102 as "high-priority" agents. In some cases, the on-board system 100 identifies only a fraction of the agents in the vicinity of the vehicle 102 as high-priority agents. The prediction system 106 is then configured to generate precise prediction data 108 for the high-priority agents using a prediction model (e.g., a prediction neural network). The prediction system 106 can generate prediction data 108 for any remaining agents which are not identified as high-priority agents, and which will be referred to in this specification as "low-priority" agents, using less computationally intensive (but potentially less precise) behavior prediction models. Alternatively, the on-board system 100 may refrain from generating any prediction data 108 for some or all of the low-priority agents. In this specification, a "prediction model" should be understood as implementing a prediction algorithm.

The on-board system 100 determines which of the agents in the vicinity of the vehicle 102 to designate as high-priority agents using an importance scoring system 114. The importance scoring system 114 is configured to generate a respective importance score 116 for each agent in the vicinity of the vehicle 102 using an importance scoring model. The importance scoring model can be implemented, for example, as a neural network model, a random forest model, a support vector machine (SVM) model, or as any other type of trainable machine learning model.

More specifically, the importance scoring model is configured to process an input that includes data characterizing the trajectory of the vehicle 102 (and, optionally, the trajectories of one or more agents in the vicinity of the vehicle 102) in accordance with trained parameter values of the importance scoring model to generate an output that defines the importance scores 116 for the agents in the vicinity of the vehicle. The importance score 116 for an agent characterizes an estimated impact of the agent on the planning decisions generated by the planning system 110 which plan the future trajectory of the vehicle 102. After generating the importance scores 116, the on-board system 100 can determine one or more of the agents in the vicinity of the vehicle with the highest importance scores to be high-priority agents.

In a particular example, at a particular intersection there may be: (i) an oncoming vehicle which may turn into the path of the vehicle 102, and (ii) a bicyclist which is far behind the vehicle 102 and unlikely to affect the planning decisions of the planning system 110. In this example, the importance scoring system 114 may generate a higher importance score for the oncoming vehicle than for the bicyclist, potentially causing the oncoming vehicle to be designated a high-priority agent and the bicyclist a low-priority agent.

By generating prediction data 108 based on the importance scores 116, the on-board system 100 can concentrate its limited computational resources on generating precise prediction data 108 for only those agents which are likely to have the biggest impact on the planning decisions generated by the planning system 110. In this manner, the on-board system 100 can generate timely prediction data 108 which enables the planning system 110 to generate planning decisions that cause the vehicle to travel along a safe and comfortable trajectory despite the limited computational resources available on-board the vehicle 102.

In some cases, the on-board system 100 can provide the importance scores 116 directly to the planning system 110. The planning system 110 can use the importance scores 116 by, for example, allocating a greater amount of computational resources to processing data characterizing the high-priority agents than the low-priority agents in generating the planning decisions 144. More generally, any processing module of the on-board system (including but not limited to the prediction system 106 and the planning system 110) can use the importance scores 116 to allocate a greater amount of computational resources to processing data characterizing the high-priority agents than the low-priority agents.

To allow the importance scoring system 114 to accurately prioritize agents, a training system 120 can determine trained parameter values 122 of the importance scoring model included in the importance scoring system 114. The training system 120 is typically hosted within a data center 124, which can be a distributed computing system having hundreds or thousands of computers in one or more locations.

The training system 120 includes a training importance scoring model 126 that is configured to process an input that includes data characterizing the trajectory of a vehicle to generate an output that defines corresponding importance scores 140 for agents in the vicinity of the vehicle. The training system 120 includes multiple computing devices having software or hardware modules that implement the operations of the training importance scoring model 126. For example, if the training importance scoring model 126 is an importance scoring neural network, then the training system 120 includes multiple computing devices having software or hardware modules that implement the respective operations of each layer of the training importance scoring neural network according to an architecture of the training importance scoring neural network. The training importance scoring model 126 is generally the same model (or almost the same model) as the on-board importance scoring model. For example, if the training importance scoring model is a neural network, then it generally has (at least partially) the same architecture as the on-board importance scoring neural network included in the importance scoring system 114.

The training importance scoring model 126 can compute the operations of the training importance scoring model 126 using current values of parameters 128 stored in a collection of model parameters 130. Although illustrated as being logically separated, the model parameters 130 and the software or hardware modules performing the operations may actually be located on the same computing device or on the same memory device.

The training system 120 trains the training importance scoring model 126 using a training data set 132 which includes multiple training examples 134. The training examples 134 may be obtained from real or simulated driving logs. Each of the training examples 134 may include: (i) an input of the training importance scoring model including trajectory representation data characterizing the trajectory of a vehicle at a respective time point (and, optionally, the trajectories of agents in the vicinity of the vehicle), and (ii) a label defining a ranking of the agents in order of their impact on planning decisions generated by a planning system of the vehicle. An example process for generating training examples 134 is described with reference to FIG. 6. An example data representation system for generating trajectory representation data is described in more detail with reference to FIG. 3.

The training importance scoring model 126 can process the inputs from the training examples 134 to generate, for each training example 134, an output which defines respective importance scores 140. A training engine 136 compares importance scores 140 to the ranking of the agents defined by the labels in the training examples 134. For example, when the training importance scoring model 126 is a neural network, the training engine 136 can compute gradients of a loss function that characterizes discrepancies between the importance scores 140 and the ranking of the agents defined by the labels in the training examples 134. The training engine 126 can use the gradients to generate updated model parameters 138.

In a particular example, the training importance scoring model 126 may be configured to generate an output that includes an output channel that is represented as a two-dimensional array of data values. Each position in the output channel corresponds to a respective spatial position in the environment. For each spatial position in the environment that is occupied by an agent, the position in the output channel that corresponds to the spatial position defines an importance score for the agent. The importance score for an agent may be a probability value (e.g., a numerical value between 0 and 1) that indicates a probability that the agent is a "high-priority" agent. For each training example, the label defining the ranking of the agents may define whether each of the agents is a "high-priority" agent or a "low-priority" agent. In this example, the loss function may be a cross-entropy classification loss function based on whether the importance scores defined by the output of the training importance scoring model accurately classify whether each agent is a high-priority agent.

The training engine 136 generates updated model parameter values 138 by using an appropriate machine learning training technique (e.g., stochastic gradient descent). The training engine 136 can then update the collection of model parameters 130 using the updated model parameter values 138.

In some cases, as will be described further with reference to FIG. 5, the on-board system may include an importance score refining model. The importance score refining model is configured to process feature representations of each agent (that include "importance score features" generated based on the output of the importance scoring model) to generate "refined" importance scores that may be more accurate than the original importance scores. The importance score refining model can be trained in a similar manner as the importance scoring model. In a particular example, the loss function for the importance score refining model may characterize whether the ranking of pairs of agents defined by the refined importance scores are consistent with the ranking of the pairs of agents defined by the labels in the training examples.

After training is complete, the training system 120 can provide a set of trained parameter values 122 to the on-board system 100 for use in generating importance scores that enable the generation of timely and accurate behavior prediction data 108. The training system 120 can provide the set of trained parameter values 122 by a wired or wireless connection to the on-board system 100.

Figure 2:
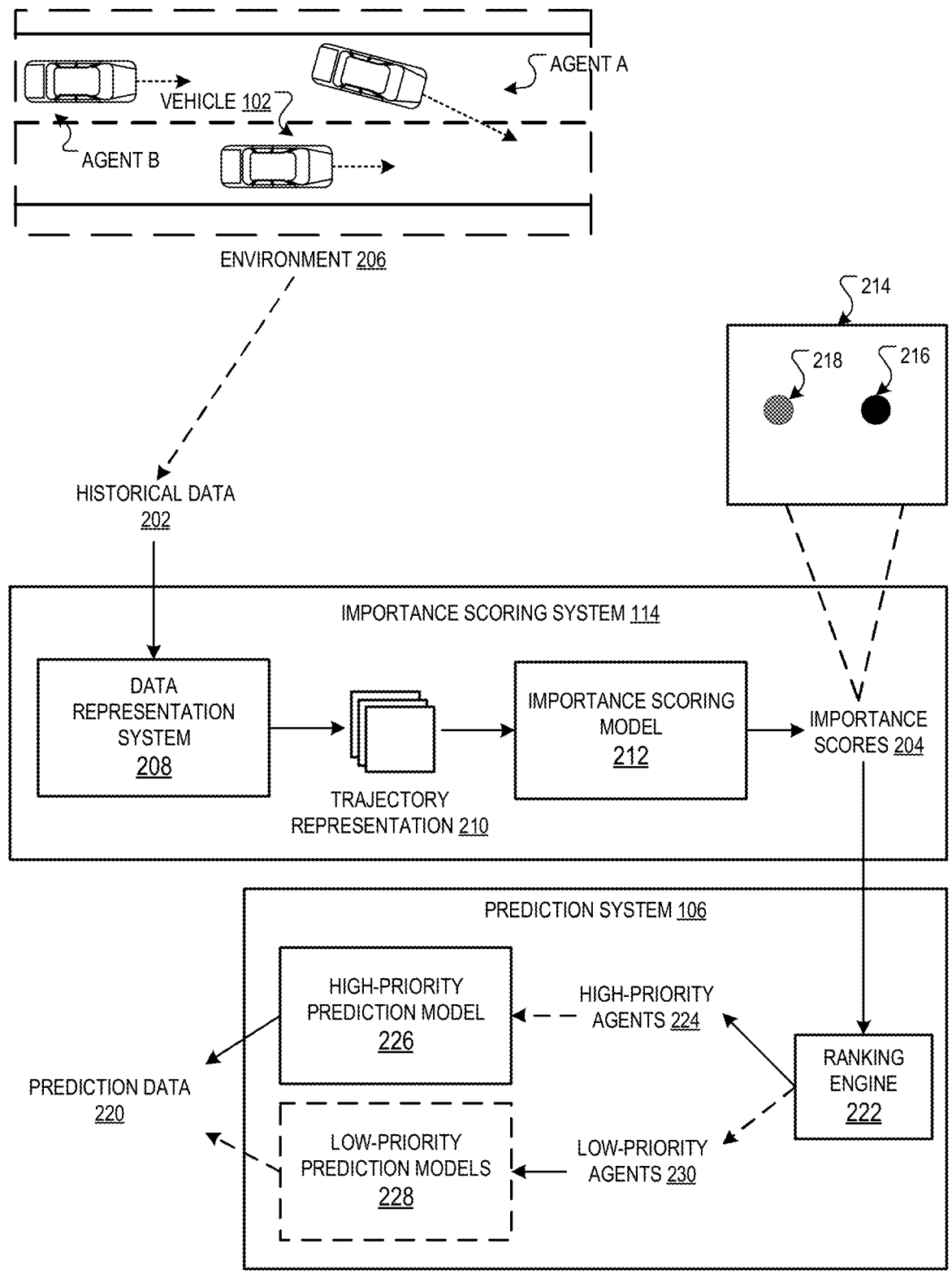
FIG. 2 is a block diagram of an example importance scoring system and an example prediction system.

FIG. 2 is a block diagram of an example importance scoring system 114 and an example prediction system 106.

The importance scoring system 114 and the prediction system 106 are examples of systems implemented as computer programs on one or more computers in one or more locations in which the systems, components, and techniques described below are implemented.

The importance scoring system 114 is configured to process historical data 202 (generated by the sensor system 104 of the vehicle 102) which characterizes at least the trajectory of the vehicle 102 (and, optionally, the trajectories of agents in the vicinity of the vehicle 102) to generate a respective importance score 204 for each agent in the vicinity of the vehicle 102. The importance score 204 for an agent characterizes an estimated impact of the agent on planning decisions generated by the planning system of the vehicle 102 which plan the future trajectory of the vehicle 102.

In a particular example depicted in FIG. 2, the environment 206 is a roadway and two vehicles, denoted Agent A and Agent B, are in the vicinity of the vehicle 102. Agent A is maneuvering to cut in front of the vehicle 102, while Agent B is travelling parallel to the vehicle 102. In this example, the importance scoring system 114 may assign a higher importance score to Agent A than to Agent B, specifically, because Agent A is likely to have a greater impact on the planning decisions generated by the planning system 110 of the vehicle 102. For example, the planning system 110 of the vehicle 102 may generate planning decisions which cause the vehicle 102 to brake to avoid a collision with Agent A. In one example, the importance scoring system 114 may generate an importance score of 0.9 for Agent A, and an importance score of 0.65 for Agent B.

To generate the importance scores 204, the importance scoring system 114 processes the historical data 202 using a data representation system 208 which is configured to generate trajectory representation data 210. As will be described in more detail with reference to FIG. 3, the trajectory representation data 210 includes a representation of the trajectory of the vehicle 102 up to the current time point. Optionally, the trajectory representation data 210 can further include one or more of: (i) representations of the trajectories of the agents in the vicinity of the vehicle up to the current time point, (ii) a representation of a candidate future trajectory of the vehicle after the current time point, or (iii) representations of predicted future trajectories of the one or more agents after the current time point. In some cases, the representations of trajectories of the other agents in the vicinity of the vehicle may be a joint representation.

The importance scoring system 114 processes the trajectory representation 210 using an importance scoring model 212 to generate an output that defines a respective importance score 204 for each of the agents in the vicinity of the vehicle 102. For example, the importance soring model 212 may generate an output that includes an output channel represented as a 2D array of data values. In this example, each position in the output channel corresponds to a respective spatial position in the environment. For each spatial position in the environment that is occupied by an agent, the position in the output channel that corresponds to the spatial position defines an importance score for the agent. In a particular example, 214 depicts an output channel corresponding to the example environment 206 depicted in FIG. 2. In this example, the spatial position 216 in the output channel corresponds to the Agent A in the environment 206 and has value 0.9, while spatial position 218 in the output channel corresponds to Agent B in the environment 206 and has value 0.65.

In some cases, the importance scoring system 114 processes one or more "additional features" (i.e., in addition to the trajectory representation 210) based on the sensor data captured by the sensors of the vehicle. For example, for each agent, the additional features may include: (1) the distance of the agent from the vehicle, (2) whether the agent is in front of the vehicle, (3) the current speed of the agent, (4) the current acceleration of the agent, (5) a type of the agent (e.g., cyclist, car, pedestrian, or child), (6) the distance of the agent from a candidate future trajectory of the vehicle, (7) an amount of time until the candidate future trajectory of the vehicle is closest to the agent, (8) an amount of time until the predicted future trajectory of the agent intersects the candidate future trajectory of the vehicle, and (9) the minimum time for the agent to collide with the vehicle if no action is taken. The additional features may be represented as a vector of numerical values (or in any other appropriate format).

Each of the importance scores 204 is represented as a respective numerical value. The importance scoring model 212 can be implemented as any appropriate model, for example, as a neural network (with any appropriate architecture), a random forest, or a support vector machine.

The importance scores 204 generated by the importance scoring system 114 are used by the prediction system 106 to generate prediction data 220 which characterizes one or more agents in the vicinity of the vehicle. For example, the prediction data 220 may be behavior prediction data which characterizes the predicted future behavior of one or more of the agents in the vicinity of the vehicle 102. In this example, for one or more of the agents in the vicinity of the vehicle 102, the prediction data 220 may define respective probabilities that the agent makes each of a predetermined number of possible driving decisions (e.g., yielding, changing lanes, passing, braking, or accelerating). As another example, the prediction data 220 may be classification prediction data which defines respective probabilities that the agent is each of a predetermined number of possible agent types (e.g., animal, pedestrian, bicyclist, car, or truck). Further examples of prediction data are described with reference to FIG. 5.

The prediction system 106 processes the importance scores 204 using a ranking engine 222 to identify which (if any) of the agents in the vicinity of the vehicle 102 are high-priority agents. For example, the ranking engine 222 may identify each agent with an importance score that satisfies a predetermined threshold as a high-priority agent. In a particular example, the ranking engine may identify each agent with an importance score that exceeds the predetermined threshold of 0.8 as a high-priority agent. As another example, the ranking engine 222 may identify a predetermined number of the agents with the highest importance scores as high-priority agents. In a particular example, the ranking engine 222 may identify the three agents with the highest importance scores as high priority agents. As another example, the ranking engine may identify a dynamically determined number of agents with the highest importance scores as high-priority agents based on the computational resources currently available on-board the vehicle for behavior prediction.

After identifying the high-priority agents 224, the prediction system 106 uses a high-priority prediction model 226 to generate respective prediction data 220 for each of the high-priority agents 224. The high-priority prediction model 226 may generate prediction data 220 for an agent by, for example, processing a representation of the trajectory of the agent up to the current time point using a prediction neural network.

The prediction system 106 can use low-priority prediction models 228 to generate respective prediction data 220 for each of the remainder of the agents which the ranking engine 222 does not identify as high-priority agents 224 (i.e., the low-priority agents 230). In some cases, the prediction system 106 processes each of the low-priority agents 230 with the same low-priority prediction model. In some cases, the prediction system 106 includes multiple low-priority prediction models with different numbers of model parameters, and processes low-priority agents that have higher importance scores with low-priority behavior prediction models with more model parameters. Generally, the high-priority prediction model 226 has a greater number of model parameters than the low-priority prediction model 228, and can therefore generate more precise prediction data 220 than the low-priority prediction model 228. However, the low-priority prediction model 228 may consume fewer computational resources (e.g., memory, computing power, or both) than the high-priority prediction model 226. In a particular example, the high-priority prediction model 226 may be implemented as a deep neural network with thousands of model parameters, while the low-priority prediction model 228 may be implemented as a linear model with tens or hundreds of model parameters.

In some cases, the prediction system 106 may refrain from generating prediction data 220 for some or all of the low-priority agents 230. For example, the prediction system 106 may postpone generating behavior prediction data for the low-priority agents 230 until a later time point when more computational resources are available. In these examples, the prediction system 106 may require that prediction data be generated for each of the agents in the vicinity of the vehicle (regardless of their priority) with at least a minimum frequency (e.g., once per second).

The prediction data 220 generated for the high-priority agents 224 by the high-priority prediction model 226, and any prediction data 220 generated for the low-priority agents by the low-priority prediction model 228, is provided to the planning system 110 for use in generating planning decisions.

Figure 3:
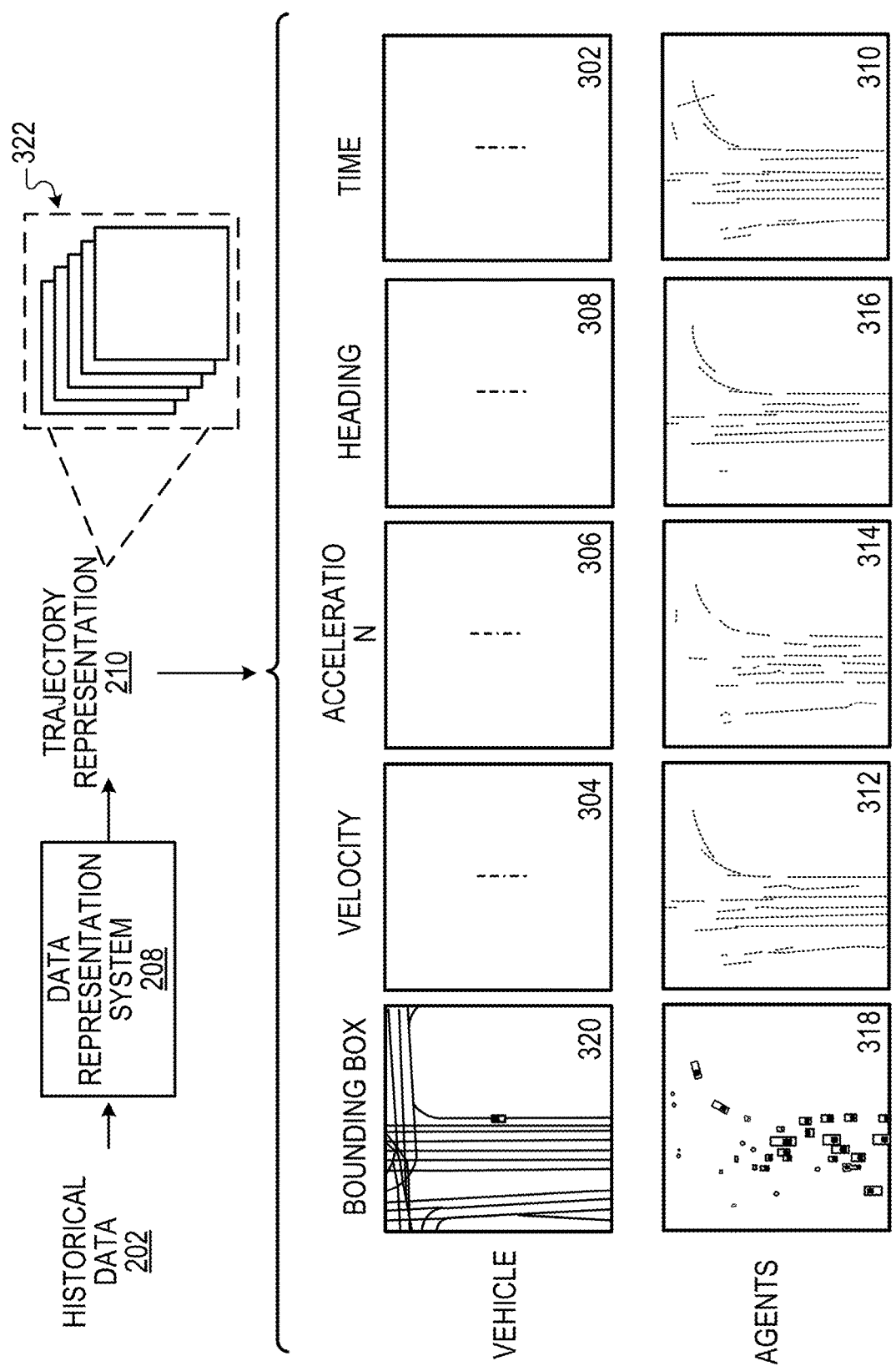
FIG. 3 is a block diagram of an example data representation system.

FIG. 3 is a block diagram of an example data representation system 208. The data representation system 208 is an example of a system implemented as computer programs on one or more computers in one or more locations in which the systems, components, and techniques described below are implemented.

The data representation system 208 processes the historical data 202 to generate the trajectory representation data 210. The trajectory representation data 210 is composed of multiple "channels". Each channel is a two-dimensional (2D) array of data values that represents a "top-down" perspective of the environment in the vicinity of the vehicle. Each position in each channel corresponds to a respective spatial position in the environment and can be indexed by respective coordinates. Each of the channels have the same dimensionality (i.e., the same number of rows and columns), the same top-down perspective of the environment, and are aligned (i.e., registered) with one another. That is, positions which are indexed by the same coordinates in different channels correspond to the same spatial position in the environment. In other words, corresponding positions in different channels correspond to the same spatial position in the environment.

To represent the trajectory of the vehicle, the trajectory representation data 210 includes a vehicle time channel and respective vehicle motion parameter channels corresponding to each of a predetermined number of motion parameters.

Each of the motion parameters characterizes a respective characteristic of the motion of the vehicle, for example, the velocity, acceleration, or heading of the vehicle. As depicted in FIG. 3, the trajectory representation data 210 may include a vehicle time channel 302, a vehicle velocity channel 304, a vehicle acceleration channel 306, and a vehicle heading channel 308.

The vehicle time channel and the vehicle motion parameter channels represent the previous trajectory of the vehicle up to the current time point, and optionally, a candidate future trajectory of the vehicle after the current time point. A candidate future trajectory of the vehicle refers to a possible trajectory of the vehicle after the current time point. More specifically, a candidate future trajectory of the vehicle specifies, for each of multiple future time points after the current time point, a spatial position in the environment that can be occupied by the agent at the future time point. For each of the multiple future time points, the candidate future trajectory further specifies possible values of each of the predetermined number of motion parameters that characterize the motion of the vehicle at the future time point.

For brevity, the description which follows refers to the vehicle time channel and the vehicle motion parameter channels representing the previous trajectory of the vehicle up to the current time point. It should be understood that the vehicle time channel and the vehicle motion parameter channels can similarly represent a candidate future trajectory of the vehicle after the current time point in addition to the previous trajectory of the vehicle up to the current time point.

The vehicle time channel represents the respective time points at which the vehicle occupies different spatial positions in the environment in the previous trajectory of the vehicle. Each motion parameter channel represents the values of the respective motion parameter characterizing the motion of the vehicle when the vehicle occupies different spatial positions in the environment in the previous trajectory of the vehicle. In particular, for each spatial position in the environment which is occupied by the vehicle, the data value in the vehicle time channel which corresponds to the spatial position defines the time point at which the vehicle occupies the spatial position. Moreover, the data value in each respective vehicle motion parameter channel which corresponds to the spatial position defines the value of the respective motion parameter characterizing the motion of the vehicle when the vehicle occupies the spatial position in the environment.

Generally, the environment may include multiple spatial positions which are not included in either the previous trajectory or the candidate future trajectory of the vehicle. For these spatial positions, the data representation system 208 can set the data values in the vehicle time channel and the vehicle motion parameter channels which correspond to these spatial positions to a default value (e.g., the value 0).

When the same spatial position in the environment is occupied by the vehicle at multiple time points, then the system 208 can set the respective data values in the vehicle time channel and motion parameter channels which correspond to the spatial position to any appropriate values. For example, the system 208 can set the respective data values in the vehicle time channel and motion parameter channels which correspond to the spatial position in accordance with the last time point when the vehicle occupies the spatial position. That is, the system 208 can set the data value in the vehicle time channel which corresponds to the spatial position to define the last time point when the vehicle occupies the spatial position. Moreover, the system 208 can set the respective data values in the vehicle motion parameter channels to define the values of the respective motion parameters characterizing the motion of the vehicle when the vehicle last occupies the spatial position.

To represent the trajectories of the agents in the environment in the vicinity of the vehicle, the trajectory representation data optionally includes an auxiliary time channel and respective auxiliary motion parameter channels corresponding to each of the predetermined number of motion parameters. As depicted in FIG. 3, the trajectory representation data 210 may include an auxiliary time channel 310, an auxiliary velocity channel 312, an auxiliary acceleration channel 314, and an auxiliary heading channel 316.

The auxiliary time channel and the auxiliary motion parameter channels jointly represent the previous trajectories of the agents up to the current time point, and optionally, predicted future trajectories of the agents after the current time point. The system 208 may obtain the predicted future trajectories of the agents as behavior prediction outputs of a behavior prediction neural network from a previous time point. A predicted future trajectory of an agent specifies, for each of multiple future time points after the current time point, a spatial position in the environment that can be occupied by the agent at the future time point. For each of the multiple future time points, the predicted future trajectory further specifies possible values of each of the predetermined number of motion parameters that characterize the motion of the agent at the future time point.

For brevity, the description which follows refers to the auxiliary time channel and the auxiliary motion parameter channels representing the previous trajectories of the agents up to the current time point. It should be understood that the auxiliary time channel and the auxiliary motion parameter channels can similarly represent predicted future trajectories of the agents after the current time point in addition to the previous trajectories of the agents up to the current time point.

The auxiliary time channel jointly represents the respective time points at which the agents occupy different spatial positions in the environment in the previous trajectories of the agents. Each auxiliary motion parameter channel represents the values of the respective motion parameters characterizing the motion of the agents when the agents occupy different spatial positions in the environment in the previous trajectories of the agents. In particular, for each spatial position in the environment which is occupied by one of the agents, the data value in the auxiliary time channel which corresponds to the spatial position defines the time point at which the agent occupies the spatial position. Moreover, the data value in each respective auxiliary motion parameter channel which corresponds to the spatial position defines the value of the respective motion parameter characterizing the motion of the agent when the agent occupies the spatial position in the environment.

Generally, the environment may include multiple spatial positions which are not included in either the previous trajectory or the predicted future trajectory of any of the agents. For these spatial positions, the data representation system 208 can set the data values in the auxiliary time channel and the auxiliary motion parameter channels which correspond to these spatial positions to a default value (e.g., the value 0).

When the same spatial position in the environment is occupied by agents at multiple time points, then the system 208 can set the respective data values in the auxiliary time channel and auxiliary motion parameter channels which correspond to the spatial position to any appropriate values.

For example, the system 208 can set the respective data values in the auxiliary time channel and auxiliary motion parameter channels which correspond to the spatial position in accordance with the last time point when one of the agents occupies the spatial position.

By jointly representing the trajectories of the agents using a single auxiliary time channel and a single auxiliary motion parameter corresponding to each motion parameter, the system 208 can generate trajectory representation data with a predetermined dimensionality irrespective of the (variable) number of agents. In this manner, the trajectory representation data 210 generated by the system 110 can be readily processed by the importance scoring model, which is configured to process trajectory representation data 210 of the predetermined dimensionality.

In some implementations, the system 208 can include further channels in the trajectory representation data 210 in addition to the time channels and motion parameter channels. For example, the trajectory representation data 210 can include one or more of: a road-graph channel, a vehicle localization channel, and an auxiliary localization channel. A road-graph channel represents a known geometry of the environment in the vicinity of the vehicle 102. For example, the road-graph channel may represent the positions of different features of the environment, including: the road, different lanes in the road, crosswalks, traffic lights, construction zones, school zones, and the like. A vehicle localization channel represents the spatial position of the vehicle in the environment at the current time point (e.g., as defined by a bounding box). An auxiliary localization channel (e.g., the auxiliary localization channel 318) jointly represents the positions of each of the agents in the environment at the current time point (e.g., as defined by bounding boxes). In the example depicted in FIG. 3, the road-graph channel and the vehicle localization channel are superimposed onto a single channel 320.

The system 110 determines the trajectory representation data 210 by aligning and channel-wise concatenating the generated channels, as depicted by 322. That is, the trajectory representation data 210 is a concatenation of the generated channels. By implicitly representing the respective trajectories of the vehicle and the agents in this format, the system 208 generates a representation which is both compact and can be effectively processed by the importance scoring model. In particular, the importance scoring model may be a convolutional neural network model. The importance scoring model can process the trajectory representation data using convolutional neural network layers defined by multi-dimensional (e.g., two- or three-dimensional) convolutional filters, thereby enabling the importance scoring model to learn complex spatial relationships between different spatial regions of the environment.

Figure 4:
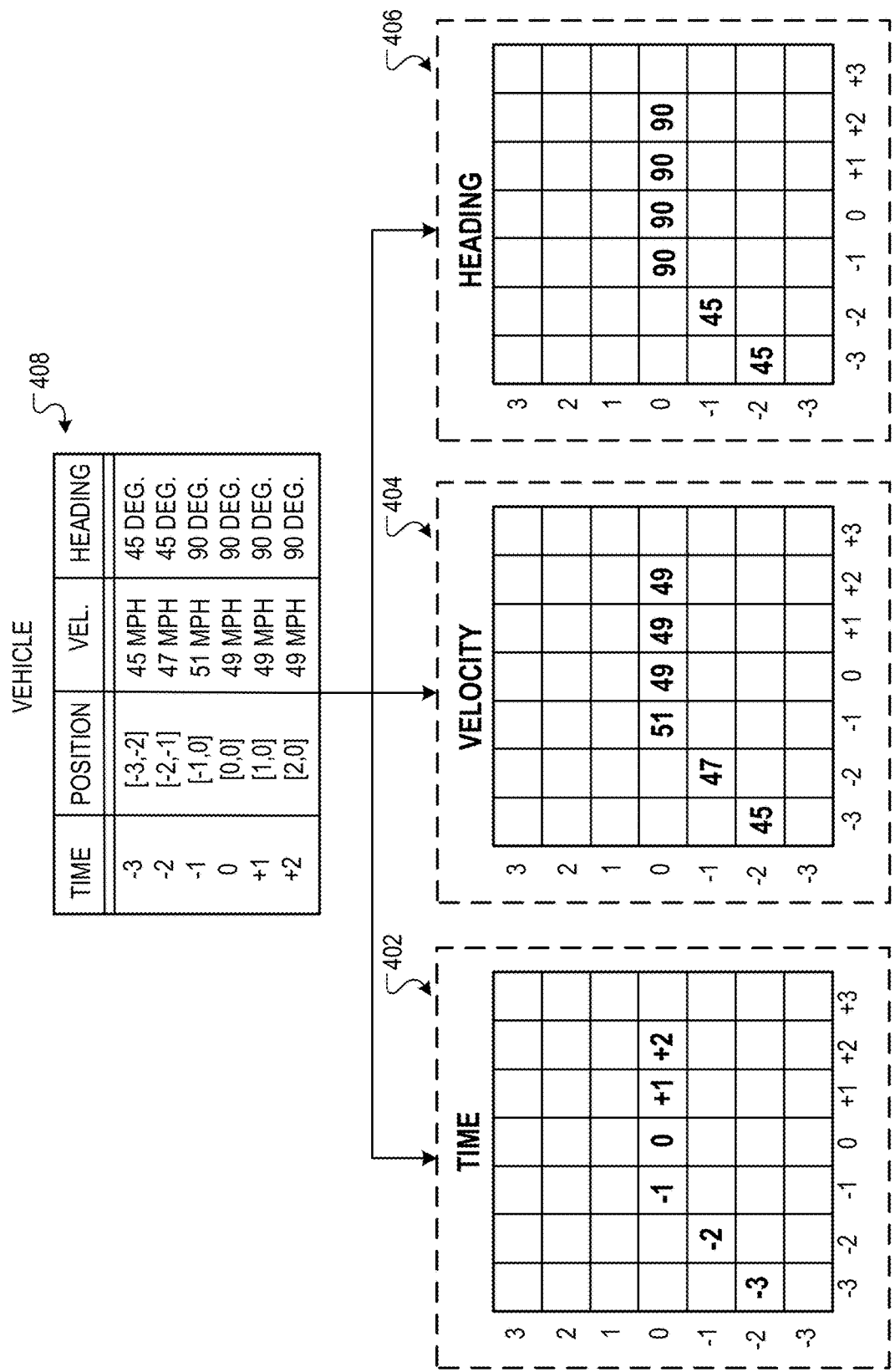
FIG. 4 is an illustration of an example process by which the data representation system can generate a vehicle time channel, a vehicle velocity channel, and a vehicle heading channel.

FIG. 4 is an illustration of an example process by which the data representation system 208 can generate a vehicle time channel 402, a vehicle velocity channel 404, and a vehicle heading channel 406, which represent a previous trajectory of the vehicle up to the current time point and a candidate future trajectory of the vehicle after the current time point.

The data which defines the previous trajectory of the vehicle (e.g., as obtained by the data representation system 208 from historical data 202) and the candidate future trajectory of the vehicle is represented in a tabular format 408. Each row of the table defines a time point, a spatial position the vehicle occupies in the environment at the time point, a velocity of the vehicle at the time point, and a heading of the vehicle at the time point.

For example, the first row of the table 408 defines that at time point −3 (e.g., 3 seconds before the current time point), the spatial position occupied by the vehicle in the environment is defined by the coordinates [−3, −2] in the channel frame of reference, the velocity of the vehicle is 45 mph, and the heading of the vehicle is 45 degrees (e.g., clockwise from North). The coordinates [−3, −2] are expressed in the channel frame of reference and can be mapped to express a spatial position in an environment frame of reference. For example, the coordinates in the channel frame of reference may represent 5 foot increments in a North-South-East-West environment frame of reference which is centered on the vehicle. In this example, the coordinates [−3, −2] in the channel frame of reference may represent a spatial position in the environment which is 15 feet West and 10 feet South of the spatial position occupied by the vehicle at the current time point. As another example, the last row of the table 408 defines that at time point +2 (e.g., 2 seconds after the current time point), the spatial position the vehicle occupies (i.e., according to the candidate future trajectory) is defined by the coordinates [2,0] in the channel frame of reference, the velocity of the vehicle is 49 mph, and the heading of the vehicle is 90 degrees.

The data representation system 208 sets the data values in the vehicle time channel corresponding to spatial positions [−3, −2], [−2, −1], [−1, 0], [0, 0], [1, 0], and [2, 0] to the respective time points −3, −2, −1, 0, +1, and +2 at which the vehicle occupies the respective spatial positions. For clarity, the data values in the vehicle time channel corresponding to the other spatial positions are shown as blank. Generally, the data representation system 208 sets the data values in the vehicle time channel corresponding to the other spatial positions to a default value (e.g., the value 0). Similarly, the data representation system 208 sets the data values in the vehicle velocity channel corresponding to spatial positions [−3, −2], [−2, −1], [−1, 0], [0, 0], [1, 0], and [2, 0] to the respective velocity values 45, 47, 51, 49, 49, and 49 which define the velocity (in mph) of the vehicle when the vehicle occupies the respective spatial positions. Similarly, the data representation system 208 sets the data values in the vehicle heading channel corresponding to spatial positions [−3, −2], [−2, −1], [−1, 0], [0, 0], [1, 0], and [2, 0] to the respective heading values 45, 45, 90, 90, 90, and 90 which define the heading (in degrees) of the vehicle when the vehicle occupies the respective spatial positions.

In some implementations, the data representation system 208 determines the channel frame of reference to cause the spatial position occupied by the vehicle at the current time point to correspond to the data value in the "center" of each of the channels. Generating trajectory representation data with a consistent channel frame of reference can facilitate training of the importance scoring model on the trajectory representation data.

Figure 5:
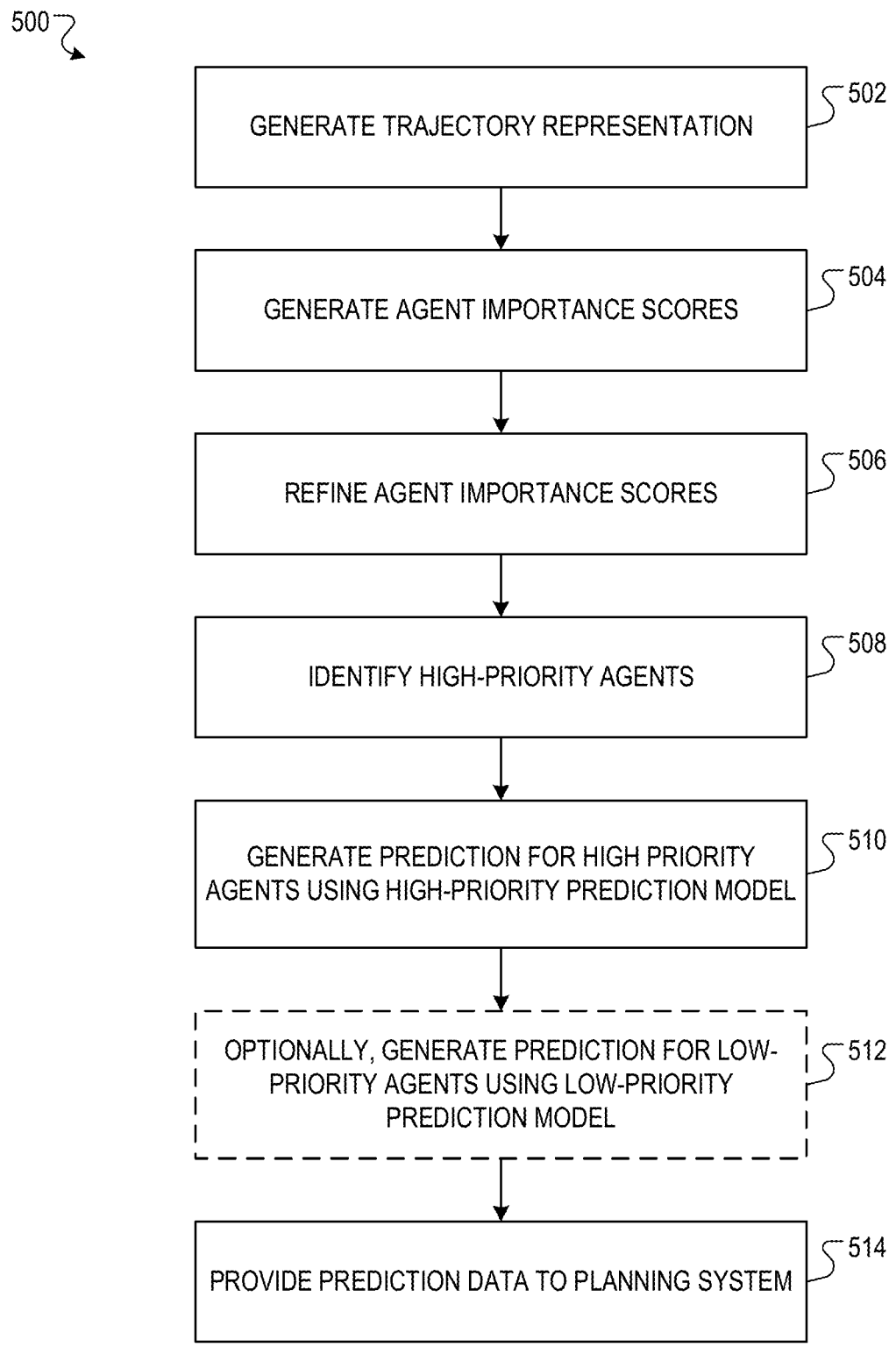
FIG. 5 is a flow diagram of an example process for generating prediction data to be provided to a planning system.

FIG. 5 is a flow diagram of an example process 500 for generating prediction data to be provided to a planning system. For convenience, the process 500 will be described as being performed by a system of one or more computers located in one or more locations. For example, an on-board system, e.g., the on-board system 100 of FIG. 1, appropriately programmed in accordance with this specification, can perform the process 500.

The system generates trajectory representation data that represents the represents the trajectory of the vehicle (502). Optionally, the trajectory representation data may further include one or more of: (i) a joint representation of the trajectories of the agents in the environment in the vicinity of the vehicle, (ii) a road-graph channel that represents the known geometry of the environment in the vicinity of the vehicle, (iii) a vehicle localization channel that represents the spatial position of the vehicle in the environment at the current time point, and (iv) an auxiliary localization channel that represents the positions of each of the agents in the environment at the current time point. An example data representation system for generating the trajectory representation data is described with reference to FIG. 3.

The system generates a respective importance score for each agent in the vicinity of the vehicle by processing the trajectory representation data using an importance scoring model (504). The importance scoring model can be implemented as any appropriate prediction model, for example, as a neural network, a random forest, or support vector machine. In a particular example, the importance scoring model may be a convolutional neural network, that is, a neural network that includes one or more convolutional layers. The convolutional neural network may be configured to generate an output channel that is represented as a two-dimensional array of data values, where each position in the output channel corresponds to a respective spatial position in the environment. For each spatial position in the environment that is occupied by an agent, the position in the output channel that corresponds to the spatial position defines the importance score of the agent. In this example, the system may determine the importance scores for each agent as the value defined by the position in the output channel that corresponds to the spatial position in the environment that is occupied by the agent.

Optionally, the system refines the importance scores for the agents using an importance score refining model (506). More specifically, the system generates a respective feature representation of each agent in the vicinity of the vehicle based in part on the output channel generated by the importance scoring model. Thereafter, the system processes the feature representation of each agent using the importance score refining model to generate a "refined" importance score for each agent which may be more accurate than the importance score generated by the initial importance scoring model. The importance score refining model can be any appropriate machine learning model, for example, a random forest model, a gradient boosted decision tree model, a neural network model, or a linear model. The importance score refining model can be trained in a similar manner as the importance scoring model, as described with reference to FIG. 1. In a particular example, the loss function may be a cross-entropy or logistic loss function that characterizes whether the ranking of pairs of agents defined by the refined importance scores are consistent with the ranking of the pairs of agents defined by the labels in the training examples. In particular, the importance score refining model can be trained by sampling pairs of agents, determining respective importance scores for each agent, and adjusting the importance score refining model parameters based on whether the respective importance scores for each of the agents is consistent with the ranking of the pair of agents defined by the label of a corresponding training example.

To generate the feature representation of an agent, the system may extract one or more "importance score features" from the output channel generated by the importance scoring model. In particular the system may extract statistics (e.g., the maximum and the average) of the values in regions of the output channel of various sizes around the position in the output channel that corresponds to the spatial location of the agent in the environment. For each agent, the system may also generate one or more "additional features" based on the sensor data captured by the sensors of the vehicle. For example, for each agent, the additional features may include: (1) the distance of the agent from the vehicle, (2) whether the agent is in front of the vehicle, (3) the current speed of the agent, (4) the current acceleration of the agent, (5) a type of the agent (e.g., cyclist, car, pedestrian, or child), (6) the distance of the agent from a candidate future trajectory of the vehicle, (7) an amount of time until the candidate future trajectory of the vehicle is closest to the agent, (8) an amount of time until the predicted future trajectory of the agent intersects the candidate future trajectory of the vehicle, and (9) the minimum time for the agent to collide with the vehicle if no action is taken. The system may determine the feature representation of each agent by combining (e.g., concatenating) the importance score features and the additional features for the agent.

In some cases, the importance scoring model may generate an output that defines importance scores for agents located within a spatial region around the vehicle (e.g., a square region centered on the vehicle) without defining importance score for agents located outside the spatial region. For example, the importance scoring model may be a computationally intensive neural network model which generates an output that only defines importance scores for agents located within the spatial region around the vehicle for reasons of computational efficiency. However, for an agent outside the spatial region around the vehicle, the system may nonetheless generate a feature representation for the agent based on the additional features derived from the sensor data generated by the vehicle (as described above). For the components of the feature representation corresponding to the importance score features (as described above), the feature representation may include default values or values understood to indicate that the importance score features are missing (e.g., "NaN" values). The system may process feature representations of agents outside the spatial region around the vehicle using the importance score refining model to generate importance scores for the agents.

In general, the refined importance scores generated by the importance score refining model may be more accurate than the importance scores generated by the importance scoring model. In particular, the importance score refining model can integrate hand-designed features characterizing the agents in the vicinity of the vehicle (e.g., which indicate the types of the agents) with importance score features that can characterize interactions between the various agents.

The system identifies the high-priority agents in the vicinity of the vehicle based on the importance scores (508). For example, the system may identify each agent with an importance score that satisfies a predetermined threshold as a high-priority agent. As another example, the system may identify a predetermined number of the agents with the highest importance scores as high-priority agents. In certain situations, the system may identify none or all of the agents in the vicinity of the vehicle as high-priority agents.

The system generates prediction data for the high-priority agents using a prediction model (510). In some implementations, the prediction model may generate classification prediction data which predicts the type of an agent (e.g., animal, pedestrian pushing cart, pedestrian directing traffic, pedestrian riding scooter, car, truck, and the like). In some implementations, the behavior prediction model may generate behavior prediction data which characterizes a predicted future behavior of an agent (e.g., braking, accelerating, changing lanes, and the like). In these implementations, the behavior prediction model may generate behavior prediction data for an agent by, for example, processing a representation of the trajectory of the agent up to the current time point using a behavior prediction neural network. A few examples follow.

In some implementations, the behavior prediction data for an agent defines, for each of multiple spatial locations in the environment, a respective probability that the agent will occupy the spatial location at a specified time point after the current time point. In these implementations, the output layer of the behavior prediction neural network may be a sigmoid layer with a respective neuron corresponding to each of the spatial locations in the environment. The probability that the agent will occupy a particular spatial location at the specified time point after the current time point may be defined as the activation of the neuron in the sigmoid output layer that corresponds to the particular spatial location.

In some implementations, the behavior prediction data for an agent defines a probability that a candidate future trajectory of the agent is the actual future trajectory of the agent. In these implementations, the output layer of the behavior prediction neural network may include a single neuron, where the activation of the neuron is defined as the output of an activation function with an output range of [0, 1] (e.g., a sigmoid activation function). The probability that the candidate future trajectory of the agent is the actual future trajectory of the agent may be defined as the activation of the single neuron in the output layer.

In some implementations, the behavior prediction data for an agent defines a respective probability that the agent will make each of a predetermined number of possible driving decisions. For example, the possible driving decisions may include one or more of: yielding, changing lanes, passing, braking, and accelerating. In these implementations, the output layer of the behavior prediction neural network may be a sigmoid layer with a respective neuron corresponding to each of the possible driving decisions. The probability that the agent will make a particular driving decision after the current time point may be defined as the activation of the neuron in the sigmoid output layer that corresponds to the particular driving decision.

Optionally, the system generates prediction data for any low-priority agents (i.e., agents that are not designated as high-priority agents) using one or more prediction models which are less computationally intensive than the prediction model used to generate the prediction data for the high-priority agents (512). For example, the prediction model(s) used to generate prediction data for the low-priority agents may have fewer model parameters than the prediction model used to generate prediction data for the high-priority agents. In a particular example, the prediction models may be neural networks, and the neural network(s) used for the low-priority agents may have fewer neural network weights than the neural network(s) used for the high-priority agents. In some cases, the system may determine not to generate any prediction data for some or all of the low-priority agents (e.g., if their respective importance scores do not satisfy a predetermined threshold).

The system provides the generated prediction data (for the high-priority agents, and optionally, for any low-priority agents) to the planning system of the vehicle (514). The planning system uses the prediction data to generate planning decisions which plan the future trajectory of the vehicle.

Figure 6:
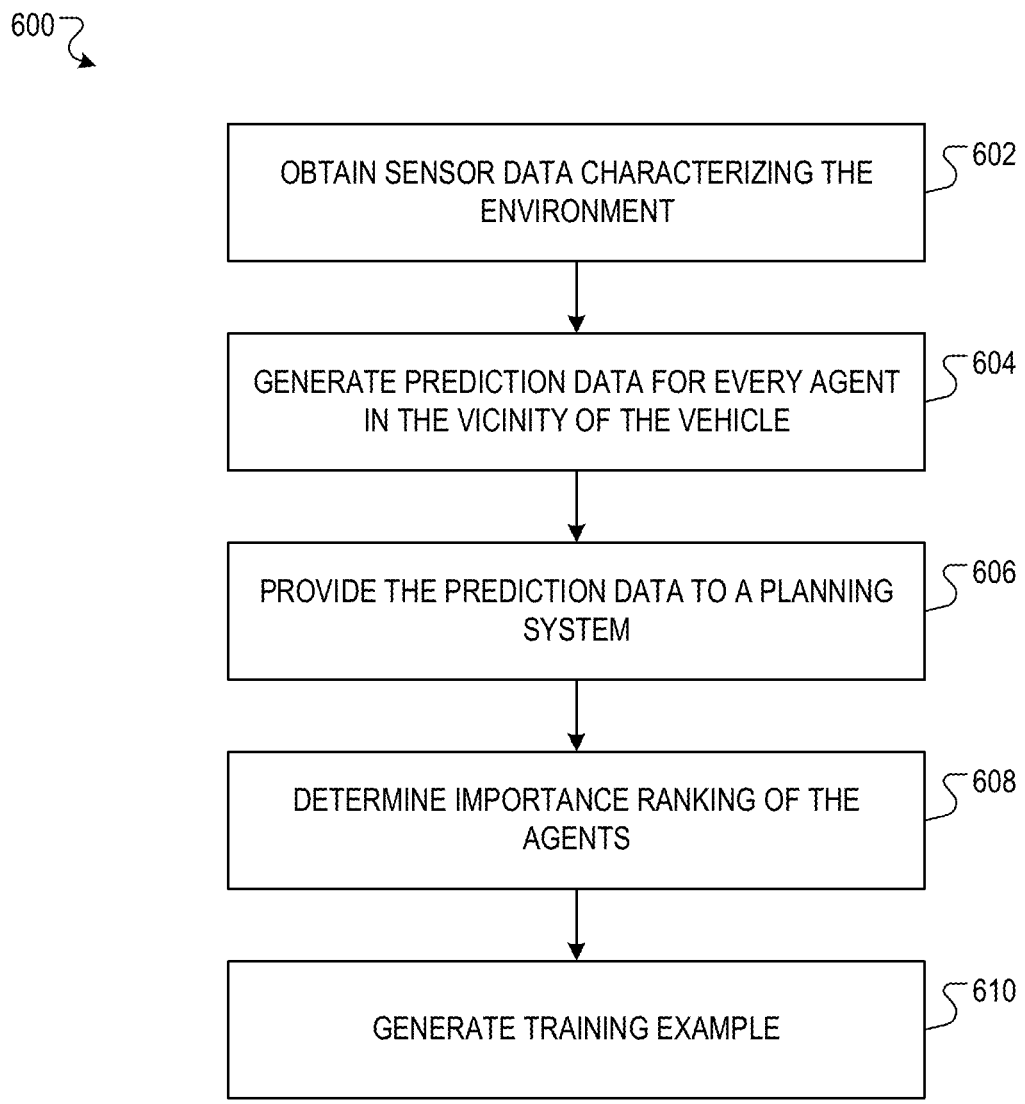
FIG. 6 is a flow diagram of an example process for generating a training example which can be used to train an importance scoring model.

FIG. 6 is a flow diagram of an example process 600 for generating a training example which can be used to train an importance scoring model. For convenience, the process 600 will be described as being performed by a system of one or more computers located in one or more locations. For example, a training system, e.g., the training system 120 of FIG. 1, appropriately programmed in accordance with this specification, can perform the process 600.

The system obtains sensor data characterizing the environment in a vicinity of a vehicle at a given time point (602). The system may obtain the sensor data from a sensor data log which is stored in a physical data storage device or a logical data storage area. The sensor data may be real sensor data characterizing a real-world environment in the vicinity of a vehicle, or simulated sensor data characterizing a simulated environment in the vicinity of a simulated vehicle. As described with reference to FIG. 1, the sensor data may be generated by one or more sensors of the vehicle, including one or more of: laser sensors, radar sensors, and camera sensors.

The system generates respective prediction data for the agents in the vicinity of the vehicle (604). For example, the system may generate respective prediction data for every agent in the vicinity of the vehicle which is identified by an object detection system of the vehicle. The behavior prediction data generated by the system for each agent characterizes the predicted future behavior of the agent. For example, for each of the agents in the vicinity of the vehicle, the behavior prediction data may define respective probabilities that the agent makes each of a predetermined number of possible driving decisions (e.g., yielding, changing lanes, passing, braking, or accelerating). To generate the behavior prediction data for an agent, the system may process a representation of the trajectory of the agent up to the given time point using a behavior prediction model.

The system provides the behavior prediction data to a planning system which is configured to process the behavior prediction data to generate planning decisions which plan a future trajectory for the vehicle (606). The planning decisions generated by the planning system can, for example, include: yielding (e.g., to other vehicles), stopping (e.g., at a Stop sign), passing other vehicles, adjusting vehicle lane position to accommodate a bicyclist, slowing down in a school or construction zone, merging (e.g., onto a highway), and parking.

The system processes the planning decisions generated by the planning system to determine a ranking of the agents in the vicinity of the vehicle at the given time point in order of their impact on the planning decisions (608). The system may determine the ranking of the agents based on how much the behavior of each agent prompts the planning system to generate planning decisions which would change the future trajectory of the vehicle. For example, the system may determine a score for each agent based on how much each agent prompts the planning system to generate planning decisions which would change the future trajectory of the vehicle, and then determine the ranking of the agents using the scores. In a particular example, the system may determine a score of 12 for Agent A, a score of 0 for Agent B, and a score of 4.5 for Agent C, in which case the system may determine the ranking of the agents as: [A,C,B].

For example, each of the planning decisions may define: (i) an action to be performed by the vehicle (e.g., accelerating, decelerating, stopping, or swerving), and (ii) an agent in the vicinity of the vehicle which prompts the planning system to generate the planning decision (if applicable). In this example, the system may generate a score of 0 for agents which do not prompt the planning system to generate any planning decisions. For an agent which does prompt the planning system to generate a planning decision, the system may determine the score for the agent as a predetermined function of the action specified by the planning decision. For example, if the planning decision specifies the action of braking at 10 feet per second squared, the system may determine the score for the agent to be 10. If a single agent prompts the planning system to generate multiple planning decisions (e.g., braking and swerving), the system can determine the score for the agent as a sum (or other combination) of the respective scores generated for each of the multiple planning decisions.

The ranking of the agents can be broadly understood to be any data which defines that certain agents in the vicinity of the vehicle have a greater impact on the planning decisions than certain other agents in the vicinity of the vehicle. For example, the ranking of the agents may define an explicit ordering of the agents from highest-rank to lowest-ranked, where each agent is assigned a distinct rank. As another example, the ranking of the agents may define a partition of the agents into multiple groups, where each group includes one or more agents. For each pair of groups including a first group and a second group, the ranking may define whether the agents in the first group have a greater impact on the planning decisions than the agents in the second group. The agents within a given group may be understood to have an equivalent impact on the planning decisions.

The system generates a training example which includes: (i) an input of the training importance scoring model that includes data characterizing the trajectory of the vehicle at a respective time point, and (ii) label data defining the ranking of the agents in the vicinity of the vehicle (610). As described with reference to FIG. 3, the system can generate the input of the training importance scoring model that is included in the training example using a data representation system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
processing an input that characterizes a trajectory of a vehicle in an environment using an importance scoring model to generate an output that defines a respective importance score for each of a plurality of agents currently located at respective locations in the environment in a vicinity of the vehicle,
wherein the importance score for an agent characterizes an estimated impact of the agent on planning decisions generated by a planning system of the vehicle which plans a future trajectory of the vehicle;
selecting, for one or more of the agents, a respective prediction model for use in generating data characterizing the agent based on the importance score for the agent, comprising:
identifying, as high-priority agents, a proper subset of the plurality of agents with the highest importance scores; and
selecting, for only those agents of the plurality of agents that are identified as high-priority agents, a first prediction model for use in generating data characterizing the agent; and generating, for each of the high-priority agents, data characterizing the agent using the first prediction model selected for the agent; and providing the data characterizing the high-priority agents generated using the first prediction model to the planning system of the vehicle to generate the planning decisions which plan the future trajectory of the vehicle.

2. The method of claim 1, further comprising:

obtaining historical data characterizing the trajectory of the vehicle in the environment, the historical data comprising, for each of a plurality of previous time points, data defining: (i) a spatial position in the environment occupied by the vehicle at the previous time point, and (ii) respective values of each motion parameter in a predetermined set of motion parameters, wherein the value of each motion parameter characterizes a respective feature of a motion of the vehicle at the previous time point;

generating a representation of the trajectory of the vehicle in the environment, wherein:
the representation of the trajectory of the vehicle in the environment is a concatenation of a plurality of channels;
each channel is represented as a two-dimensional array of data values;
each position in each channel corresponds to a respective spatial position in the environment;
corresponding positions in different channels correspond to the same spatial position in the environment;
the channels comprise a time channel and a respective motion channel corresponding to each motion parameter in the predetermined set of motion parameters; and
for each particular spatial position in the environment occupied by the vehicle at a particular previous time point:
the position in the time channel which corresponds to the particular spatial position defines the particular previous time point; and
for each motion channel, the position in the motion channel which corresponds to the particular spatial position defines the value of the motion parameter corresponding to the motion channel at the particular previous time point;

wherein processing an input that characterizes a trajectory of the vehicle in the environment comprises processing an input that includes the representation of the trajectory of the vehicle in the environment.

3. The method of claim 2, wherein:
the output of the importance scoring model comprises an output channel that is represented as a two-dimensional array of data values;
each position in the output channel corresponds to a respective spatial position in the environment; and
for each spatial position in the environment that is occupied by an agent of the plurality of agents at a current time point, the position in the output channel that corresponds to the spatial position defines an importance score of the agent.

4. The method of claim 3, further comprising, for each agent of the plurality of agents:
generating a respective feature representation of the agent, comprising:
generating one or more importance score features of the agent from the output channel;
generating one or more additional features of the agent based on sensor data captured by one or more sensors of the vehicle; and
generating the feature representation of the agent from the importance score features of the agent and the additional features of the agent;
processing the feature representation of the agent using an importance score refining model to generate a refined importance score for the agent that characterizes an estimated impact of the agent on planning decisions generated by a planning system of the vehicle which plans a future trajectory of the vehicle.

5. The method of claim 2, wherein obtaining the respective values of each motion parameter in the predetermined set of motion parameters for a previous time point comprises one or more of:
obtaining the value of a velocity motion parameter which characterizes a velocity of the vehicle at the previous time point;
obtaining the value of an acceleration motion parameter which characterizes an acceleration of the vehicle at the previous time point; and
obtaining the value of a heading motion parameter which characterizes a heading of the vehicle at the previous time point.

6. The method of claim 2, wherein the input processed by the importance scoring model further comprises one or more of: (i) a road-graph channel representing a known geometry of the environment, (ii) a vehicle localization channel which represents a spatial position of the vehicle in the environment at a current time point by a vehicle bounding box, and (iii) an auxiliary localization channel which represents respective spatial positions of the plurality of agents in the environment at a current time point by respective bounding boxes.

7. The method of claim 2, further comprising generating a joint representation of trajectories of the plurality of agents in the environment in the vicinity of the vehicle, wherein the input processed by the importance scoring model further comprises the joint representation of the trajectories of the plurality of agents.

8. The method of claim 7, wherein:
the joint representation of the trajectories of the plurality of agents in the environment comprises an auxiliary time channel and a respective auxiliary motion channel corresponding to each motion parameter in the predetermined set of motion parameters;
each channel is represented as a two-dimensional array of data values and each data value in each channel corresponds to a respective spatial position in the environment; and
for each particular spatial position in the environment occupied by a particular agent of the plurality of agents at a particular previous time point:
the data value in the auxiliary time channel which corresponds to the particular spatial position defines the particular previous time point; and
for each auxiliary motion channel, the data value in the auxiliary motion channel which corresponds to the particular spatial position defines a value of the motion parameter corresponding to the auxiliary motion channel which characterizes a respective feature of a motion of the particular agent at the particular previous time point.

9. The method of claim 1, wherein identifying, as high-priority agents, a proper subset of the plurality of agents with the highest importance scores comprises:

identifying, as high-priority agents, a predetermined number of the plurality of agents with the highest importance scores.

10. The method of claim 1, wherein selecting, for one or more of the agents, a respective prediction model for use in generating data characterizing the agent based on the importance score for the agent further comprises:
identifying, as low-priority agents, one or more of the agents that are not identified as high-priority agents;
selecting, for each of the low-priority agents, a second prediction model for use in generating data characterizing the agent;
wherein the first prediction model has a first number of model parameters, the second prediction model has a second number of model parameters, and the first number of model parameters is greater than the second number of model parameters; and
further comprising:
generating, for each of the low-priority agents, data characterizing the agent using the second prediction model selected for the agent; and
providing the data characterizing the low-priority agents generated using the second prediction model to the planning system in addition to the data characterizing the high-priority agents generated using the first prediction model.

11. A system comprising:
one or more computers; and
one or more storage devices communicatively coupled to the one or more computers, wherein the one or more storage devices store instructions that, when executed by the one or more computers, cause the one or more computers to perform operations comprising:
processing an input that characterizes a trajectory of a vehicle in an environment using an importance scoring model to generate an output that defines a respective importance score for each of a plurality of agents currently located at respective locations in the environment in a vicinity of the vehicle,
wherein the importance score for an agent characterizes an estimated impact of the agent on planning decisions generated by a planning system of the vehicle which plans a future trajectory of the vehicle;
selecting, for one or more of the agents, a respective prediction model for use in generating data characterizing the agent based on the importance score for the agent, comprising:
identifying, as high-priority agents, a proper subset of the plurality of agents with the highest importance scores; and
selecting, for only those agents of the plurality of agents that are identified as high-priority agents, a first prediction model for use in generating data characterizing the agent; and
generating, for each of the high-priority agents, data characterizing the agent using the first prediction model selected for the agent; and
providing the data characterizing the high-priority agents generated using the first prediction model to the planning system of the vehicle to generate the planning decisions which plan the future trajectory of the vehicle.

12. The system of claim 11, wherein the operations further comprise:
obtaining historical data characterizing the trajectory of the vehicle in the environment, the historical data comprising, for each of a plurality of previous time points, data defining: (i) a spatial position in the environment occupied by the vehicle at the previous time point, and (ii) respective values of each motion parameter in a predetermined set of motion parameters, wherein the value of each motion parameter characterizes a respective feature of a motion of the vehicle at the previous time point;
generating a representation of the trajectory of the vehicle in the environment, wherein:
the representation of the trajectory of the vehicle in the environment is a concatenation of a plurality of channels;
each channel is represented as a two-dimensional array of data values;
each position in each channel corresponds to a respective spatial position in the environment;
corresponding positions in different channels correspond to the same spatial position in the environment;
the channels comprise a time channel and a respective motion channel corresponding to each motion parameter in the predetermined set of motion parameters; and
for each particular spatial position in the environment occupied by the vehicle at a particular previous time point:
the position in the time channel which corresponds to the particular spatial position defines the particular previous time point; and
for each motion channel, the position in the motion channel which corresponds to the particular spatial position defines the value of the motion parameter corresponding to the motion channel at the particular previous time point;
wherein processing an input that characterizes a trajectory of the vehicle in the environment comprises processing an input that includes the representation of the trajectory of the vehicle in the environment.

13. The system of claim 12, wherein:
the output of the importance scoring model comprises an output channel that is represented as a two-dimensional array of data values;
each position in the output channel corresponds to a respective spatial position in the environment; and
for each spatial position in the environment that is occupied by an agent of the plurality of agents at a current time point, the position in the output channel that corresponds to the spatial position defines an importance score of the agent.

14. The system of claim 13, wherein the operations further comprise, for each agent of the plurality of agents:
generating a respective feature representation of each agent, comprising:
generating one or more importance score features of the agent from the output channel;
generating one or more additional features of the agent based on sensor data captured by one or more sensors of the vehicle; and
generating the feature representation of the agent from the importance score features of the agent and the additional features of the agent;
processing the feature representation of the agent using an importance score refining model to generate a refined importance score for the agent that characterizes an estimated impact of the agent on planning decisions generated by a planning system of the vehicle which plans a future trajectory of the vehicle.

15. The system of claim 12, wherein obtaining the respective values of each motion parameter in the predetermined set of motion parameters for a previous time point comprises one or more of:
- obtaining the value of a velocity motion parameter which characterizes a velocity of the vehicle at the previous time point;
- obtaining the value of an acceleration motion parameter which characterizes an acceleration of the vehicle at the previous time point; and
- obtaining the value of a heading motion parameter which characterizes a heading of the vehicle at the previous time point.

16. One or more non-transitory computer storage media storing instructions that when executed by one or more computers cause the one or more computers to perform operations comprising:
- processing an input that characterizes a trajectory of a vehicle in an environment using an importance scoring model to generate an output that defines a respective importance score for each of a plurality of agents currently located at respective locations in the environment in a vicinity of the vehicle,
- wherein the importance score for an agent characterizes an estimated impact of the agent on planning decisions generated by a planning system of the vehicle which plans a future trajectory of the vehicle;
- selecting, for one or more of the agents, a respective prediction model for use in generating data characterizing the agent based on the importance score for the agent, comprising:
  - identifying, as high-priority agents, a proper subset of the plurality of agents with the highest importance scores; and
  - selecting, for only those agents of the plurality of agents that are identified as high-priority agents, a first prediction model for use in generating data characterizing the agent; and
- generating, for each of the high-priority agents, data characterizing the agent using the first prediction model selected for the agent; and
- providing the data characterizing the high-priority agents generated using the first prediction model to the planning system of the vehicle to generate the planning decisions which plan the future trajectory of the vehicle.

17. The one or more non-transitory computer storage media of claim 16, wherein the operations further comprise:
- obtaining historical data characterizing the trajectory of the vehicle in the environment, the historical data comprising, for each of a plurality of previous time points, data defining: (i) a spatial position in the environment occupied by the vehicle at the previous time point, and (ii) respective values of each motion parameter in a predetermined set of motion parameters, wherein the value of each motion parameter characterizes a respective feature of a motion of the vehicle at the previous time point;
- generating a representation of the trajectory of the vehicle in the environment, wherein:
  - the representation of the trajectory of the vehicle in the environment is a concatenation of a plurality of channels;
  - each channel is represented as a two-dimensional array of data values;
  - each position in each channel corresponds to a respective spatial position in the environment;
  - corresponding positions in different channels correspond to the same spatial position in the environment;
  - the channels comprise a time channel and a respective motion channel corresponding to each motion parameter in the predetermined set of motion parameters; and
  - for each particular spatial position in the environment occupied by the vehicle at a particular previous time point:
    - the position in the time channel which corresponds to the particular spatial position defines the particular previous time point; and
    - for each motion channel, the position in the motion channel which corresponds to the particular spatial position defines the value of the motion parameter corresponding to the motion channel at the particular previous time point;
- wherein processing an input that characterizes a trajectory of the vehicle in the environment comprises processing an input that includes the representation of the trajectory of the vehicle in the environment.

18. The one or more non-transitory computer storage media of claim 17, wherein:
- the output of the importance scoring model comprises an output channel that is represented as a two-dimensional array of data values;
- each position in the output channel corresponds to a respective spatial position in the environment; and
- for each spatial position in the environment that is occupied by an agent of the plurality of agents at a current time point, the position in the output channel that corresponds to the spatial position defines an importance score of the agent.

19. The one or more non-transitory computer storage media of claim 18, wherein the operations further comprise, for each agent of the plurality of agents:
- generating a respective feature representation of each agent, comprising:
  - generating one or more importance score features of the agent from the output channel;
  - generating one or more additional features of the agent based on sensor data captured by one or more sensors of the vehicle; and
  - generating the feature representation of the agent from the importance score features of the agent and the additional features of the agent;
- processing the feature representation of the agent using an importance score refining model to generate a refined importance score for the agent that characterizes an estimated impact of the agent on planning decisions generated by a planning system of the vehicle which plans a future trajectory of the vehicle.

20. The one or more non-transitory computer storage media of claim 17, wherein obtaining the respective values of each motion parameter in the predetermined set of motion parameters for a previous time point comprises one or more of:
- obtaining the value of a velocity motion parameter which characterizes a velocity of the vehicle at the previous time point;
- obtaining the value of an acceleration motion parameter which characterizes an acceleration of the vehicle at the previous time point; and obtaining the value of a heading motion parameter which characterizes a heading of the vehicle at the previous time point.

* * * * *